United States Patent [19]

Sauvageau

[11] 4,235,038
[45] Nov. 25, 1980

[54] ANIMAL TRAP

[76] Inventor: Claude Sauvageau, Notre-Dame-de-la-Merci, Quebec, Canada

[21] Appl. No.: 40,191

[22] Filed: May 18, 1979

[51] Int. Cl.³ .............................................. A01M 23/30
[52] U.S. Cl. .................................................... 43/82
[58] Field of Search ................. 43/81, 81.5, 82, 83, 43/83.5, 93

[56] References Cited

U.S. PATENT DOCUMENTS

| | | | |
|---|---|---|---|
| 437,179 | 9/1890 | Dennis | 43/81 |
| 469,429 | 2/1892 | Wells | 43/81 |
| 768,292 | 8/1904 | Miller | 43/82 |
| 1,422,049 | 7/1922 | Gould | 43/82 |
| 1,517,210 | 11/1924 | Gomber | 43/83 |
| 1,753,814 | 4/1930 | Weller | 43/81 |
| 1,802,272 | 4/1931 | Rice | 43/81 |
| 3,010,245 | 11/1961 | Conibear | 43/90 |
| 3,106,036 | 10/1963 | Lehn | 43/93 |
| 3,204,365 | 9/1965 | Sartin | 43/81 |
| 3,816,955 | 6/1974 | Conibear | 43/90 |
| 3,932,955 | 1/1976 | Desrosiers | 43/81 |
| 3,936,973 | 2/1976 | Larocque | 43/81 |

*Primary Examiner*—Nicholas P. Godici

[57] ABSTRACT

An animal trap is disclosed. The trap comprises a frame, a stationary jaw mounted on the frame, a movable jaw pivotally mounted on the stationary jaw, springs, interconnecting the frame and the movable jaw for moving the movable jaw in contact with the stationary jaw, a trigger element interconnecting the frame and the movable jaw, such trigger element being in the shape of a flat strip having the ends thereof slightly curved inwardly to hold the frame and the movable jaw together when the trap is set, and a bait holder depending from the trigger element whereby a slight displacement of the bait by an animal will disengage the trigger element from the movable jaw to release the trap.

4 Claims, 5 Drawing Figures

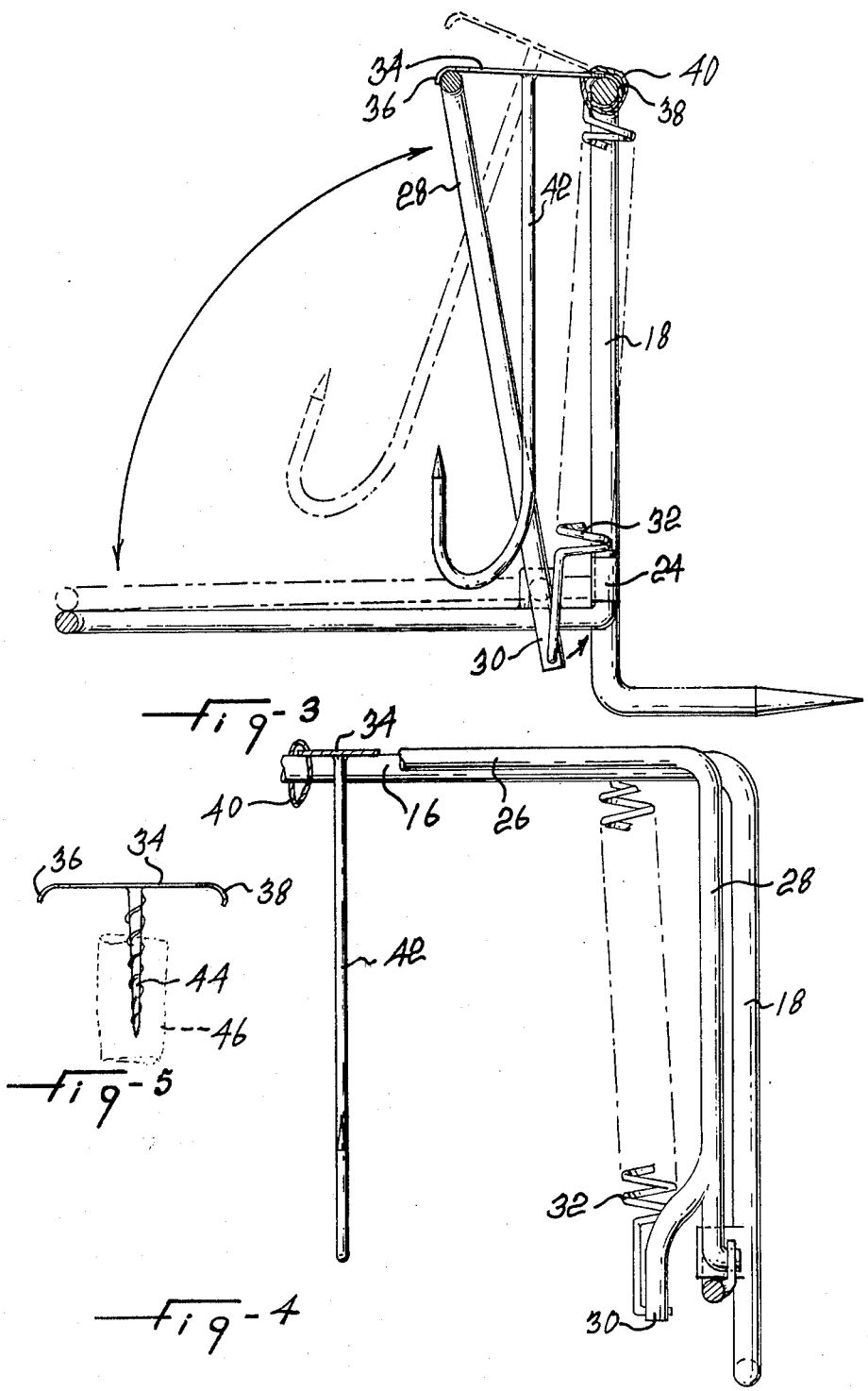

ANIMAL TRAP

This invention relates to an animal trap, and more particularly to a trap especially designed to kill instantly wild animals, such as minks, muskrats and otters without damaging the fur.

A number of small animal traps exist. Examples of such traps are the ones disclosed in U.S. Pat. No. 1,517,210 issued Nov. 25, 1924 or U.S. Pat. No. 3,204,365 issued Sept. 7, 1965. However, most of these traps contain a large number of parts which are not easy to keep clean, and are often a hazard to the operator when setting the trap. Another disadvantage of the known traps is that the triggering mechanism of the traps often contain pivoting parts which trap water; when cold weather sets in, the water freezes and this makes the trap less sensitive.

It is therefore the object of the present invention to provide an animal trap which is simple in construction, may easily be cleaned, which can be set quickly with little danger to the operator, and which is not affected by cold weather.

The trap, in accordance with the invention, comprises a frame, a stationary jaw mounted on the frame, a movable jaw pivotally mounted on the stationary jaw, springs interconnecting the frame and the movable jaw for moving the movable jaw in contact with the stationary jaw, a trigger element interconnecting the frame and the movable jaw, such trigger element being in the shape of a flat strip having the ends thereof slightly curved inwardly to hold the frame and the movable jaw together when the trap is set and a bait holder depending from the trigger element, whereby a slight displacement of the bait by an animal will disengage the trigger element from the movable jaw to release the trap.

The frame is preferably made of a U-shaped rod or wire defining a cross member between two parallel legs and the two legs of the frame have pointed ends for insertion into a tree or into the ground.

The movable jaw is also preferably made of a U-shaped rod or wire defining a cross member between two parallel legs and the cross member between the legs of both the frame and the movable jaw are substantially parallel to each other when the animal trap is set with the legs thereof extending downwardly. A vertical lever is secured to the end of each leg of the movable jaw and the springs are attached between the cross member of the frame and the ends of the levers so as to increase the leverage action of the springs as the movable jaw closes on the stationary jaw.

The invention will now be disclosed, by way of example, with reference to a preferred embodiment illustrated in the accompanying drawings in which:

FIG. 3 illustrates a section view taken along line 3—3 of FIG. 2;

FIG. 4 illustrates a section view taken along line 4—4 of FIG. 2; and

FIG. 5 is a side view of the trigger element fitted with a modified bait holder.

Figure 1:
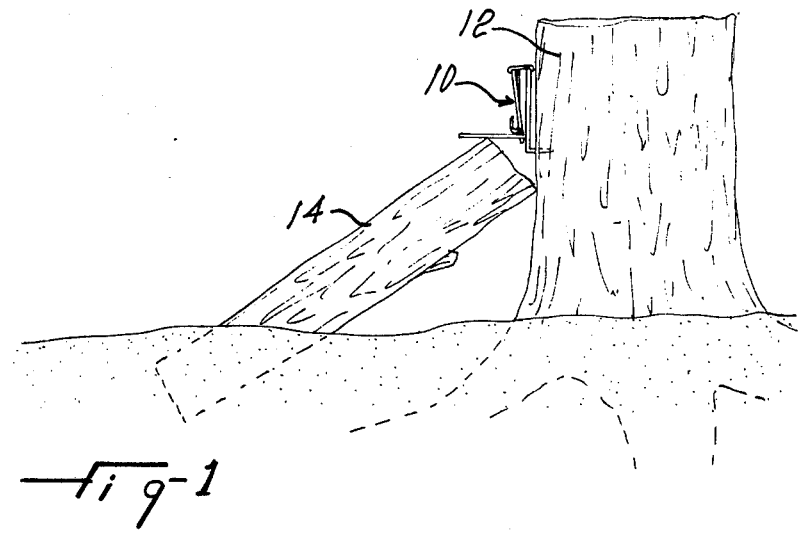
FIG. 1 illustrates an animal trap in accordance with the invention mounted on a tree.

Referring to FIG. 1 of the drawings, there is shown a trap 10 in accordance with the invention attached to a tree 12. The trap is mounted at a certain distance above ground and a piece of wood 14 is placed against the tree so as to permit the animal to reach the bait.

Figure 2:
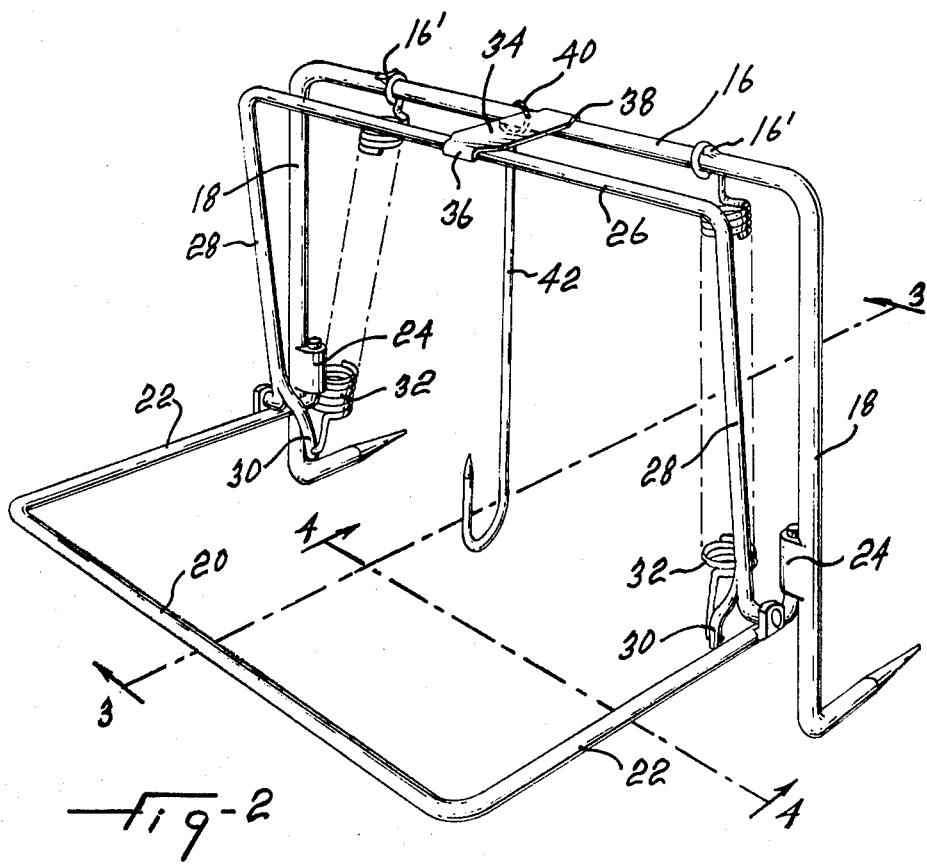
FIG. 2 illustrates a perspective view of a trap in accordance with the invention.

As shown in FIGS. 2-4, the trap includes a frame made of a U-shaped rod or wire defining a cross member 16 and two parallel legs 18. The legs are pointed and turned at 90° for nailing into the tree, although they could also be straight for insertion into the ground when the trap is installed at ground level. It is however advantageous to install the trap well above ground and snow level for obvious reasons.

A stationary jaw also in the form of a U-shaped rod or wire defining a cross member 20 and two parallel legs 22 is mounted on the legs of the frame. It will be noted that the end of each leg 22 is inserted into a hole 24 in a boss forming part of leg 18 so as to permit dismantling of the trap for transport, cleaning and storing purposes.

A movable jaw also in the form of a U-shaped rod or wire defining a cross member 26 and parallel legs 28 is pivotally mounted on the legs 22 of the stationary jaw adjacent the connecting point of the stationary jaw to the frame. A lever 30 extends from the end of each leg 28 and a tension coil spring 32 is connected between cross member 16 of the frame and the end of lever 30 for closing the movable jaw onto the stationary jaw. Bosses 16' formed on top of cross member 16 locate the curved ends of springs 32 in proper position.

A trigger element 34 is horizontally mounted between cross members 16 and 26 of the frame and the movable jaw, respectively. The trigger element consists of a flat strip which has inwardly curved ends 36 and 38 which are designed to simply hold the two cross members 16 and 26 when the trap is set. It will be noted that the end 38 of the trigger element does not encircle the cross member 16. It is however loosely attached thereto by means of a wire loop 40. This way, water cannot be trapped between end 38 and cross member 16 and thus there is no danger of jamming due to eventual freezing of this water.

A bait holder 42 is welded or otherwise secured to the trigger element so that it is about vertical when the trap is set. The bait holder is in the form of a hook when meat is to be used as a bait. It may also be simply a screw 44, as illustrated in FIG. 5, when a piece of aspen branch 46 is used as a bait for trapping beavers, for example.

The above disclosed trap operates as follows:

When the trap is set, the trigger element 34 is placed over the two cross members 16 and 26 of the frame and movable jaw, respectively. The curved ends 36 and 38 of the trigger element hold the two members together. However, when an animal pulls on the bait, the trigger member is pivoted by the bait holder to free the movable jaw, as shown in FIG. 3. It will be noted that the short lever 30 secured to the legs of the movable jaw exerts an increased leverage action as the movable jaw of the trap swings toward the stationary jaw so as to instantly kill the animal and prevent damage to the fur.

The above disclosed trap can also be easily set from above without danger to the operator. The trap has a minimum number of parts and can be dismantled for cleaning. Finally, the stationary jaw can be removed from the frame for transport and storing.

Although the invention has been disclosed with reference to a preferred embodiment, it is to be understood that it is not limited to such embodiment and that other alternatives are also envisaged. For example, the frame and the movable and stationary jaws can be made of rods of rectangular or square cross sections. The shape of the frame and of the movable and stationary jaws could also vary.

What I claim is:

1. An animal trap comprising:
   (a) a frame made of a U-shaped rod or wire defining a cross member between two parallel legs, and wherein the two legs of the frame have pointed ends for insertion into a tree or into the ground;
   (b) a stationary jaw mounted on the frame;
   (c) a movable jaw pivotally mounted on the stationary jaw, said movable jaw being a U-shaped rod or wire defining a cross member between two parallel legs, and wherein the cross member between the legs of both the frame and the movable jaw are substantially parallel to each other when the animal trap is set with the legs thereof extending downwardly;
   (d) a vertical lever secured to the end of each leg of said movable jaw;
   (e) tension springs attached between the cross member of said frame and the ends of said levers for moving said movable jaw in contact with said stationary jaw, said levers serving to increase the leverage action of the springs;
   (f) a trigger element interconnecting the cross members of the frame and of the movable jaw, said trigger element being in the shape of a flat strip having the ends thereof slightly curved inwardly to hold said cross members together when the trap is set; and
   (g) a bait holder rigidly depending from said trigger element, whereby a slight displacement of the bait by an animal will disengage the trigger element from the movable jaw to release the trap.

2. An animal trap as defined in claim 1, wherein the stationary jaw is removably mounted on the frame by inserting the legs of the stationary jaw into a boss forming part of the legs of the frame.

3. An animal trap as claimed in claim 1 or 2, wherein said bait holder is a screw for screwing into a piece of tree branch serving as a bait.

4. An animal trap as claimed in claim 1 or 2, wherein said bait holder is a U-shaped hook for hooking into a piece of meat serving as a bait.

* * * * *